DEMODULATOR CIRCUIT

Filed Nov. 23, 1959

JAMES C. KYLE
GLEN ROBINSON
INVENTORS

BY Lyon & Lyon
ATTORNEYS

United States Patent Office 3,145,344
Patented Aug. 18, 1964

3,145,344
DEMODULATOR CIRCUIT

James C. Kyle, Glendora, and Glen Robinson, Pasadena, Calif., assignors to Physical Sciences Corporation, a corporation of California Filed Nov. 23, 1959, Ser. No. 854,682
13 Claims. (Cl. 328—134)

This invention relates to demodulator circuits and, more particularly, to improvements therein for providing signals at a first frequency which vary in a manner determined by signals at a second frequency.

In servo control systems of the type where a servomotor is to be actuated to operate a control device, in accordance with the signals from a sensing device, often the frequency of the signal which drives the servomotor is different than the frequency of the signal derived from the sensing device. The servomotor usually is operated by a relatively low-frequency alternating current, while the sensing device, which may be a bridge or other type of arrangement, may be operated using signals at a relatively higher frequency. The problem then arises as to how to convert the control signals derived from the sensing device into control signals of the proper frequency for operating the servomotor. Solutions to the frequency-conversion problem, or demodulation problem, have been provided. However, these solutions normally have shown considerable zero drift and temperature sensitivity.

An object of the present invention is to provide a novel demodulator circuit for performing the indicated frequency conversion.

Yet another object of the present invention is the provision of a demodulator circuit which provides the indicated conversion in a more stable manner than has been done heretofore.

These and other objects of the present invention are achieved in a circuit wherein there are two amplifiers each having an anode, cathode, and control electrode. Phase-inverted signals are derived from a source of signals having the frequency at which it is desired to operate the servomotor. These phase-inverted signals are applied to the cathode electrodes of the amplifiers. Phase-inverted signals are derived from a source of signals which have the frequency at which it is desired to operate the sensing device. These are respectively applied to the anode electrodes of the two amplifiers. The control or error signals which are derived from the sensing device are applied to the control electrodes of the amplifier with the same phase. The respective amplifiers will then amplify the first frequency signal only when the frequency of the second signal on the control grid and on the anode of an amplifier are in phase. The anode electrodes in the amplifiers can then provide an output consisting of a control signal at the first frequency which varies in phase and amplitude substantially in accordance with the variations of the error signal at the second frequency.

Figure 1:
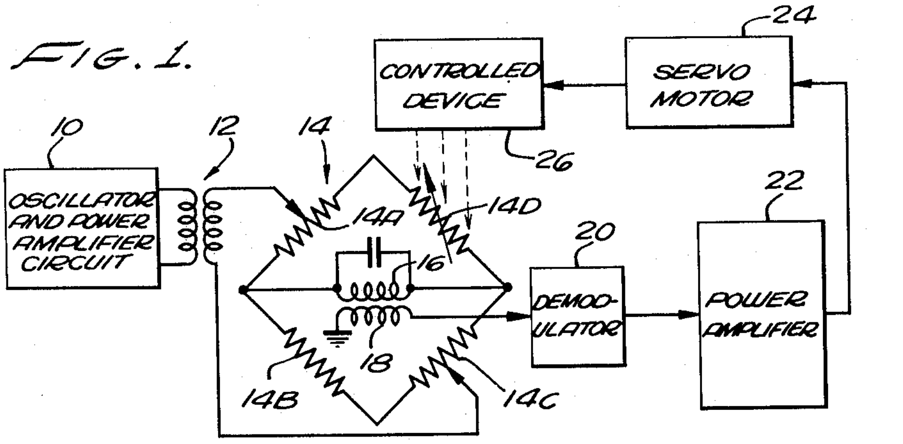
Figure 2:
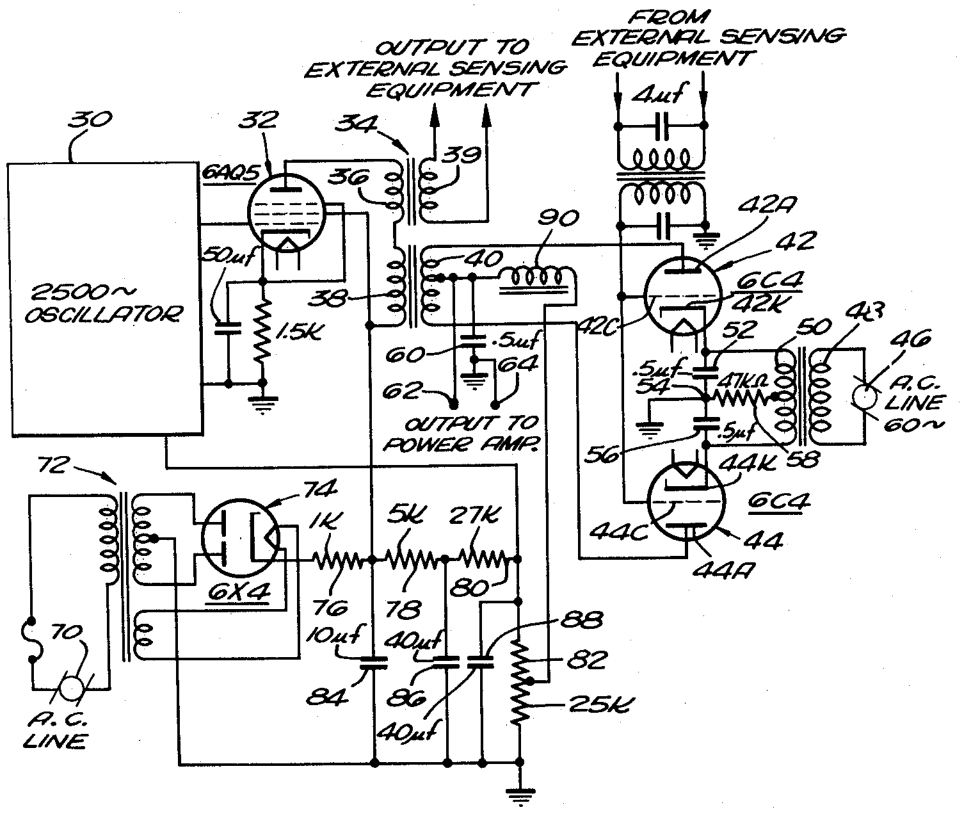

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a block diagram shown to illustrate the utility of the invention; and FIGURE 2 is a circuit diagram of an embodiment of the invention.

Referring now to FIGURE 1, there may be seen a block diagram of a typical servo control system which illustrates the utility of this invention. Often it is desired to operate the sensing apparatus in a servo system at a high frequency relative to the frequency of operation of the servomotor in order to obtain the advantages of more sensitive error detection, as well as a simplification of the electronic components which may be employed with a higher frequency as contrasted with those which may be employed with a frequency on the order of that used on a power line. Thus, there is shown in FIGURE 1 a rectangle 10, which represents an oscillator and power amplifier circuit. The oscillator provides oscillations at a frequency of 2500 cycles per second. The output of the oscillator and power-amplifier 10 is applied to a transformer 12. The transformer applies the oscillations to a sensing bridge 14.

The sensing bridge structure is shown by way of illustration herein, and not by way of limitation. For the purposes of exposition, the bridge is shown as containing four arms 14A, 14B, 14C, 14D. Arms 14A and 14C comprise adjustable potentiometers for establishing the level of the signal applied to the bridge, as well as the null position thereof. Arm 14B is a fixed impedance. Arm 14D is a variable impedance. This variable impedance may be, for example, a resistor, the resistance value of which varies in accordance with the temperature of the surrounding environment.

A transformer having a primary winding 16 connected across opposite diagonals of the bridge 14, and a secondary winding 18 is employed for sensing the bridge unbalance. The output of the winding 18 is applied to a demodulator 20, which serves the purpose of converting the control or error signal detected into a control signal at a frequency suitable for operation of the servomotor. The output of the demodulator 20 is applied to a power amplifier 22. The output of the power amplifier 22 is applied to the servomotor 24, which in turn operates a controlled device 26. The controlled device may operate a furnace for altering the temperature sensed by the bridge arm 14D. Such operation should result in an alteration of temperature, which tends to reduce the error signal detected by the bridge 14.

In accordance with the prior art, the demodulator 20 would usually include some type of frequency conversion device, such as a motor generator, or the error signal would be converted electronically down to the frequency at which it was desired to operate the servomotor, and thereafter this signal would be amplified for controlling the servomotor. These expedients are operable, but as previously indicated are expensive and somewhat complex.

FIGURE 2 is a circuit diagram of an embodiment of this invention. Shown therewith are the values of the components used in an embodiment of the invention which was constructed. It is to be understood that these circuit component values are by way of illustration and should not be construed as a limitation upon the invention. A rectangle 30 represents as oscillator which generates oscillations at a frequency of 2500 cycles per second, by way of example. The output of the oscillator 30 is applied to a power amplifier 32. This, in the illustrative embodiment, comprises a vacuum tube 32, which amplifies the signals received from the oscillator and applies them to an output transformer 34. The output transformer 34 will include two primary windings 36, 38, which are connected in series across the anode and screen grid of the power amplifier tube 32. Associated with the primary winding 36 is a secondary winding 39. This secondary winding may be connected to external sensing apparatus, such as the bridge 14, illustrated in FIGURE 1.

Associated with the primary winding 38 is a center-tapped secondary winding 40. One end of the center-tapped secondary winding 40 is connected to the anode 42A of a first amplifier tube 42; the other end of the secondary winding 40 is connected to the anode 44A of a second amplifier 44. Signals are applied in the same phase to the control electrodes 42C, 44C of the respective amplifiers 42, 44. These signals are the error signals, or control signals, which are at the frequency of the oscillator 30. At this point it should be noted that the transformer primary winding 38 and secondary winding 40 are employed to derive out-of-phase signals from the oscillator 30, which are applied to the two amplifiers, while the error signals are applied in the same phase to the control electrodes of the two amplifiers. The amplifiers can thus compare the phase difference between the oscillatory output signals from the transformer 40 and the error signals.

A source of power 46 having the frequency at which it is desired to operate the servomotor is connected to the primary 48 of a transformer. In the embodiment of the invention, this was the usual 60-cycle power source. Associated with a transformer primary winding 48 is a center-tapped secondary winding 50. One end of the winding 50 is connected to the cathode 42K of the amplifier 42; the other end of the secondary winding 50 is connected to the cathode 44K of the amplifier 44. A first capacitor 52 connects the cathode 42K to a junction point 54, which in turn is connected to ground. A second capacitor 56 connects the cathode 44K to the junction point 54. A resistor 58 connects the center tap of the winding 50 to the junction point 54. The center tap of the transformer secondary winding 40 is connected through a third capacitor 60 to ground. It can therefore be seen that out-of-phase signals are derived from the source 46 and applied to the amplifiers 42, 44 by means of their cathodes. A pair of output terminals 62, 64 are respectively connected to the center tap of the secondary winding 40 and to ground. It will be appreciated that ground and the junction point 64 are connected together and are to be considered synonomous.

Operating potential for the circuit just described is derived in the usual manner from a 60-cycle, 115-volt power source 70, which is connected to a power transformer 72. The power transformer applies its output to a rectifier tube 74. The rectifier tube cathode is connected to a series of resistors 76, 78, 80, 82, and the last of these resistors is connected to ground and to the center tap of the transformer 72. Filter capacitors 84, 86, 88 are respectively connected between the resistor junctions and ground. Connections are also made from these various resistor junctions to the oscillator 30 to the power amplifier 32 in the usual and well-known fashion for providing them with the direct-current voltages required for securing their operation. A very small amplitude direct-current potential is derived from the last resistor 82 in the series string in the power supply. This small voltage is applied to the anodes 42A, 44A of the amplifiers over a circuit, which includes a choke coil 90 and the center tap of the secondary winding 40. This small, direct-current potential is applied to the amplifiers to minimize space-charge effect.

In operation, either amplifier 42 or 44 will pass and amplify the 60-cycle signal only when some of the 2500-cycle error signal on the control grid is in phase with the 2500-cyle signal applied to the anode. Thus, the phase of the oscillator signals from the transformer 40 serves as a reference for comparison with the phase of the error signal. Deviations therebetween result in a corresponding amplification of the 60-cycle signal applied across the amplifiers by means of their cathodes. Any shifts in phase on the part of the basic reference oscillator 30 do not cause any deleterious effects to the system, since the error signal which is derived from the oscillator 30 will have its phase shifted simultaneously and by the same amount. Therefore, in addition to its other features, this invention minimizes the requirements for a stable oscillator. The cathodes of the amplifiers are essentially placed at ground potential as far as the oscillator 30 frequency is concerned by the capacitors 52, 54, which couple these cathodes to ground. Similarly, the center tap of the secondary winding 40 is bypassed to ground for the oscillation frequency by the capacitor 60. Thus, any of the 2500-cycle-per-second oscillations which are not balanced out at the center tap of the secondary winding 40 are bypassed to ground. There is effectively, therefore, a direct conversion from the frequency of the error or control signal which is applied to the control grids 42C, 44C of the amplifiers to a control signal at a frequency desired to operate the servomotor, which control signals is derived from the center tap of the secondary winding 40.

The system described, it will be appreciated, is far simpler than any of the previously known expedients. In the embodiment of the invention which was constructed, the frequencies employed were 2500 cycles for the oscillator and 60-cycles-per-second for the servocontrol motor. These are recited by way of illustration as an operative embodiment of the invention and are not to be considered as a limitation, since those skilled in the art can rearrange not only the frequencies, but also the component values given here by way of illustration without departing from the spirit and scope of this invention.

There has accordingly been described and shown herein a novel, useful, and simple demodulator circuit which can provide a signal at a first frequency which will vary in accordance with a signal at a second frequency.

We claim:

1. In combination, first means for providing reference signals at a relatively high frequency wherein the reference signals have a variable phase, second means for providing first control signals at a second frequency lower from the relatively high frequency, third means responsive to the reference signals for producing second control signals at the relatively high frequency and with a phase variable with respect to the reference signals, a control member connected to the first, second and third means to receive the first and second control signals and the reference signals and to produce resultant signals at the relatively high frequency in accordance with any difference in phase between the second control signals and the reference signals where such resultant signals are modulated at the second frequency, and means operatively coupled to the control member and responsive to the resultant signals for obtaining the production of output signals at the second frequency in accordance with the difference in phase between the second control signals and the reference signals.

2. In combination, a control member having first and second input electrodes and an output electrode, means operatively coupled to the output electrode of the control member for introducing reference signals at a relatively high frequency to the output electrode of the control member, means operatively coupled to the first input electrode of the control member and responsive to the reference signals for introducing to the first input electrode of the control member first control signals at the relatively high frequency and with a phase variable with respect to the reference signals, means operatively coupled to the second input electrode of the control member for introducing signals to the second input electrode at a second frequency lower than the relatively high frequency to obtain the production at the output electrode of resultant signals at the relatively high frequency in accordance with any difference in phase between the reference and first control signals where the resultant signals are modulated at the second frequency, and means having a reactive impedance and connected in an electrical circuit with the control member and responsive to the resultant signals for producing output signals at the second frequency in accordance with the difference in phase between the reference and first control signals.

3. In combination,
a control member having first, second and third electrodes,
means for providing reference signals at a relatively high frequency,
means responsive to the reference signals for introducing the reference signals to the first electrode of the control member,
means for providing first control signals at a second frequency lower than the relatively high frequency,
means responsive to the first control signals for introducing the first control signals to the second electrode of the control member,
means responsive to the reference signals for producing second control signals at the relatively high frequency and with a phase variable with respect to that of the reference signals,
means responsive to the second control signals to obtain the introduction of the second control signals to the third electrode of the control member for the production of signals at the first electrode of resultant signals at the relatively high frequency in accordance with any difference in phase between the reference signals and the second control signals where such resultant signals are modulated at the second frequency, and
means operatively coupled to the first electrode of the control member and responsive to the resultant signals for obtaining the production of output signals at the second frequency and in accordance with the difference in phase between the reference signals and the second control signals.

4. In combination,
a control member having first and second input electrodes and an output electrode,
means operatively coupled to the output electrode of the control member for introducing reference signals at a relatively high frequency to the output electrode of the control member,
means operatively coupled to the first input electrode of the control member and responsive to the reference signals for introducing to the first input electrode of the control member first control signals at the relatively high frequency and with a phase variable with respect to the reference signals,
means operatively coupled to the second input electrode of the control member for introducing second control signals to the second input electrode at a second frequency lower than the relatively high frequency to obtain the production at the output electrode of resultant signals at the relatively high frequency in accordance with any difference in phase between the reference signals and the first control signals where such resultant signals are modulated at the second frequency,
output means connected in an electrical circuit with the control member and responsive to the resultant signals for inhibiting the production of signals at the relatively high frequency and for obtaining the production of output signals at the second frequency in accordance with the difference in phase between the reference signals and the first control signals,
drive means responsive to the output signals from the output means for providing a drive in accordance with such signals, and
servo means operatively coupled to the drive means to be driven by the drive means and responsive to the reference signals for producing the first control signals in accordance with the drive imparted to the servo means by the drive means.

5. In combination,
servo means responsive to reference signals at a relatively high frequency to provide at the first frequency first control signals having a variable phase in accordance with the operation of the servo means,
drive means operatively coupled to the servo means and responsive to output signals at a second frequency lower than the relatively high frequency for driving the servo means to obtain the variable characteristics in the first control signals from the servo means,
first means for providing second control signals at the relatively high frequency,
second means for providing reference signals at the second frequency,
a control member connected to the servo means and the first and second means to receive the first and second control signals and the reference signals and to produce resultant signals at the second frequency in accordance with differences in phase between the reference signals at the relatively high frequency and the second control signals, and
means operatively coupled to the control member and responsive to the resultant signals for obtaining the production of the output signals in accordance with the difference in phase between the second control signals and the reference signals at the relatively high frequency.

6. In combination,
first means for providing first and second reference signals having a first particular phase relationship to each other and having a relatively high frequency,
second means for providing first and second control signals having a second particular phase relationship to each other and having a second frequency lower than the relatively high frequency,
third means for providing third control signals having the relatively high frequency and having a phase relationship variable with respect to the first and second reference signals,
a first control member connected to the first, second and third means to receive the first reference signals and the first and third control signals and to produce first resultant signals at the relatively high frequency in accordance with the relative phase of the first reference signals and the third control signals where the first resultant signals are modulated at the second frequency in accordance with the phase of the first reference signals,
a second control member connected to the first, second and third means to receive the second reference signals and the second and third control signals and to produce second resultant signals at the relatively high frequency in accordance with the relative phase of the second reference signals and the control signals where the second resultant signals are modulated at the second frequency in accordance with the phase of the second reference signals, and
means operatively connected to the first and second control members and responsive to the first and second resultant signals to produce output signals at the second frequency and in accordance with the phase relationship between the third control signals and the first and second reference signals.

7. In combination,
servo means responsive to first reference signals at a relatively high frequency to provide at the first frequency first control signals having variable characteristics in accordance with the operation of the servo means,
drive means responsive to output signals at a second frequency lower than the relatively high frequency to drive the servo means for the production of the signals having the variable characteristics by the servo means, first means for providing the first reference signals at the relatively high frequency, second means responsive to the first reference signals for producing second reference signals at the relatively high frequency and with a particular phase relationship to the first reference signals, third means for providing second and third control signals at the second frequency and with a particular phase relationship, a first control member connected to the first, servo and third means to receive the first and second control signals and the first reference signal and to produce first resultant signals at the relatively high frequency in accordance with any difference in phase between the first control signals and the first reference signals where the first resultant signals are modulated in phase at the second frequency in accordance with the phase of the second control signals, a second control member connected to the second, servo and third means to receive the first and third control signals and the second reference signal and to produce second resultant signals at the relatively high frequency in accordance with any difference in phase between the first control signals and the second reference signals where the second resultant signals are modulated in phase at the second frequency in accordance with the phase of the third control signals, and means operatively connected to the first and second control members and responsive to the first and second resultant signals for producing the output signals at the second frequency in accordance with the difference in phase between the first control signals and the first and second reference signals.

8. In combination, first and second control members each having first and second input electrodes and an output electrode, first means for providing first and second reference signals at a relatively high frequency and with a particular phase relationship, second means responsive to the first and second reference signals for producing first control signals at the relatively high frequency, third means for producing second and third control signals at a second frequency lower than the relatively high frequency and with a particular phase relationship, the first control member being connected to the first, second and third means to receive the first reference signal at its output terminal and the first and second control signals respectively at its first and second input terminals and to produce at the output terminal first resultant signals at the relatively high frequency in accordance with any difference in phase between the first reference signals and the first control signals where the first resultant signals are modulated at the second frequency in accordance with the phase of the second control signals, the second control member being connected to the first, second and third means to receive the second reference signal at its output terminal and the first and third control signals respectively at its first and second input terminals and to produce at the output terminal second resultant signals at the relatively high frequency in accordance with any difference in phase between the second reference signals and the first control signals where the second resultant signals are modulated at the second frequency in accordance with the phase of the third control signals, and means connected to the output electrodes of the first and second control members to produce output signals at the second frequency in accordance with the difference in phase between the first control signal and the first and second reference signals.

9. In combination, first means for providing first reference signals at a relatively high frequency, servo means responsive to the first reference signals at the relatively high frequency to provide at the relatively high frequency first control signals having a variable phase in accordance with the operation of the servo means, drive means operatively coupled to the servo means and responsive to output signals at a second frequency lower than the relatively high frequency for driving the servo means to obtain variations in the phase of the first control signals in accordance with such drive, a first control member having first and second input electrodes and an output electrode, a second control member having first and second input electrodes and an output electrode, second means responsive to the first reference signals for producing second reference signals at the relatively high frequency and with a particular phase relationship to the first reference signals, third means for providing second and third control signals at the second frequency and with a particular phase relationship, the first and second input electrodes of the first control member being respectively connected to the servo and the third means to receive the first and second control signals and the output electrode being connected to the first means to receive the first reference signals and to produce at the output electrode first resultant signals at the relatively high frequency in accordance with any difference in phase between the first reference and first control signals where the first resultant signals are modulated at the second frequency in accordance with the phase of the second control signals, the first and second input electrodes of the second control member being respectively connected to the servo and third means to receive the first and third control signals and the output electrode being connected to the second means to receive the second reference signals and to produce at the output electrode second resultant signals at the relatively high frequency in accordance with any difference in phase between the second reference and first control signals where the second resultant signals are modulated at the second frequency in accordance with the phase of the third control signals, and means operatively connected to the output electrodes of the first and second control members and responsive to the first and second resultant signals to produce the output signals at the second frequency in accordance with the difference in phase between the first control signal and the first and second reference signals.

10. In a system wherein there are provided a first source of signals at a first frequency and a second source of signals at a second frequency and it is desired to provide first signals at said first frequency having variations in phase and amplitude representative of the variations in phase and amplitude of second signals at said second frequency comprising first and second amplifiers each having an anode, cathode and control electrode, means for applying said second signals to the control electrodes of said amplifiers, means for deriving out-of-phase signals at said first frequency from said first source of signals, means for applying said out-of-phase signals at said first frequency to the cathode electrodes of said amplifiers, means for deriving out-of-phase signals at said second frequency from said second source of signals, means for applying said out-of-phase signals at said second frequency to the anode electrodes of said amplifiers, and means connected to said means for deriving out-of-phase signals at said second frequency to derive therefrom the first signals.

11. In a system as recited in claim 1 wherein said means for deriving out-of-phase signals at said second frequency from said second source of signals includes a transformer having a center-tapped secondary winding, said means for applying said out-of-phase signals at said second frequency to the anode electrodes of said first and second amplifiers includes connections between the respective ends of said center-tapped secondary winding and said anode electrodes of said first and second amplifiers, and said means connected to said means for deriving out-of-phase signals at said second frequency to derive therefrom first signals includes a connection to the center tap of said secondary winding.

12. In a system wherein there are provided a first source of signals at a first frequency and a second source of signals at a second frequency and it is desired to provide first signals at said first frequency having variations in phase and amplitude representative of the variations in phase and amplitude of second signals at said second frequency comprising first and second amplifiers each having an anode, cathode and control electrode, means for applying said second signals to the control electrodes of said amplifiers, a first transformer having a primary and center-tapped secondary winding, means connecting said first transformer primary winding to said first source of signals, means connecting the respective ends of said center-tapped secondary winding to the respective cathode electrodes of said amplifiers, a junction point, first and second capacitors respectively connecting said respective cathode electrodes to said junction point, a resistor connected between said junction point and the center tap of said secondary winding, a second transformer having a primary winding and a center-tapped secondary winding, means connecting said second transformer primary winding to said second source of signals, means connecting the respective ends of said second transformer secondary winding to the respective anode electrodes of said amplifiers, a third capacitor connected between said second transformer secondary winding center tap and said junction point, and connections to said second transformer secondary winding center tap and said junction point for providing said first signals.

13. A demodulator circuit comprising a first and second amplifier each having an anode, cathode and control electrode, a first transformer having a primary and center-tapped secondary winding, means for applying signals at a first frequency to said first transformer primary winding, means connecting the respective ends of said first transformer secondary winding to the respective cathode electrodes of said first and second amplifiers, a junction point, a first and second capacitor respectively connecting said respective cathode electrodes to said junction point, resistive means connecting said first transformer secondary winding center tap to said junction point, a second transformer having a primary winding and a center-tapped secondary winding, means for applying signals at a second frequency to said second transformer primary winding, means connecting the respective ends of said second transformer secondary winding to the respective anode electrodes of said first and second amplifiers, a third capacitor connected between said second transformer secondary winding center tap and said junction point, means for applying control signals to said first and second amplifier control grids, and means for deriving an output signal at said first frequency connected to said second transformer secondary winding center tap and said junction point.

References Cited in the file of this patent

UNITED STATES PATENTS

| | | |
|---|---|---|
| 2,491,606 | Dickey et al. | Dec. 20, 1949 |
| 2,564,063 | Herold | Aug. 14, 1951 |
| 2,569,268 | Wild | Sept. 25, 1951 |
| 2,577,668 | Wilmotte et al. | Dec. 4, 1951 |
| 2,646,544 | Sands | July 21, 1953 |